(12) United States Patent
Bulgin

(10) Patent No.: US 9,173,517 B2
(45) Date of Patent: Nov. 3, 2015

(54) NUTRITIONAL PRODUCT DISPENSER

(75) Inventor: Tom Bulgin, Surrey (GB)

(73) Assignee: BIOSAUCE HOLDINGS LIMITED, Surrey Normandy (GB)

( * ) Notice: Subject to any disclaimer, the term of this patent is extended or adjusted under 35 U.S.C. 154(b) by 908 days.

(21) Appl. No.: 12/869,924

(22) Filed: Aug. 27, 2010

(65) Prior Publication Data

US 2011/0052764 A1  Mar. 3, 2011

(30) Foreign Application Priority Data

Sep. 2, 2009  (GB) .................................. 0915190.3
Jun. 25, 2010  (GB) .................................. 1010715.9

(51) Int. Cl.
*G06F 17/00* (2006.01)
*A47J 31/40* (2006.01)

(52) U.S. Cl.
CPC .............. *A47J 31/401* (2013.01); *A47J 31/402* (2013.01); *A47J 31/404* (2013.01)

(58) Field of Classification Search
USPC ......................................................... 700/233
See application file for complete search history.

(56) References Cited

U.S. PATENT DOCUMENTS

| | | | | |
|---|---|---|---|---|
| 5,975,365 A * | 11/1999 | Hsieh | .......................... | 222/129.4 |
| 6,759,072 B1 | 7/2004 | Gutwein et al. | | |
| 7,295,889 B2 * | 11/2007 | Lahteenmaki | ................ | 700/233 |
| 7,457,685 B2 * | 11/2008 | D'Silva | ......................... | 700/239 |
| 7,762,181 B2 * | 7/2010 | Boland et al. | ................... | 99/322 |
| 7,827,015 B2 * | 11/2010 | McGoogan et al. | ............ | 703/11 |
| 7,912,579 B2 * | 3/2011 | Stettes | .......................... | 700/233 |
| 7,976,883 B2 * | 7/2011 | Guerrero et al. | .............. | 426/232 |
| 8,029,184 B2 * | 10/2011 | Hoogland | ................... | 366/160.1 |
| 8,235,581 B2 * | 8/2012 | Verhoeven et al. | ......... | 366/165.2 |
| 2004/0026452 A1 | 2/2004 | Santiago et al. | | |
| 2006/0081653 A1 | 4/2006 | Boland et al. | | |
| 2006/0278093 A1 | 12/2006 | Biderman et al. | | |
| 2007/0073557 A1 | 3/2007 | Abramson | | |
| 2008/0206429 A1 | 8/2008 | Guerrero et al. | | |

FOREIGN PATENT DOCUMENTS

| | | |
|---|---|---|
| EP | 1 382 321 | 1/2004 |
| EP | 1 382 321 A1 | 1/2004 |
| KR | 2002-0043206 A | 6/2002 |

(Continued)

OTHER PUBLICATIONS

Intellectual Property Office, Search Report, issued Dec. 7, 2010 in Application No. GB1010715.9.

(Continued)

*Primary Examiner* — Timothy Waggoner
(74) *Attorney, Agent, or Firm* — Alchemy-Partners, PC

(57) ABSTRACT

An apparatus for dispensing nutritional products including a number of storage hoppers for powdered ingredients, a controllable outlet connected to each storage hopper and operable to release controlled amounts of the powdered ingredients, a controllable liquid supply, a mixer, and a control system including a user interface for capturing data from a user. The control system uses the data that the user inputs to determine the quantity of each powdered ingredient and the quantity of liquid to be released to create a nutritional product, and sends signals to the liquid supply and the outlets to release the determined quantity of liquid and each powdered ingredient into the mixer to be mixed before being dispensed into a container.

13 Claims, 4 Drawing Sheets

(56) References Cited

FOREIGN PATENT DOCUMENTS

| WO | WO 95/02387 | 1/1995 |
| WO | 02/25608 A1 | 3/2002 |
| WO | WO 03/056493 | 7/2003 |
| WO | 2005/111955 A1 | 11/2005 |
| WO | WO 2005/111955 | 11/2005 |
| WO | 2007/135611 A2 | 11/2007 |

OTHER PUBLICATIONS

Combined Search and Examination Report received in Application No. GB 0915190.3 dated Dec. 21, 2009.
European Search Report received in Application No. 10174355.7 dated Jan. 11, 2011.

* cited by examiner

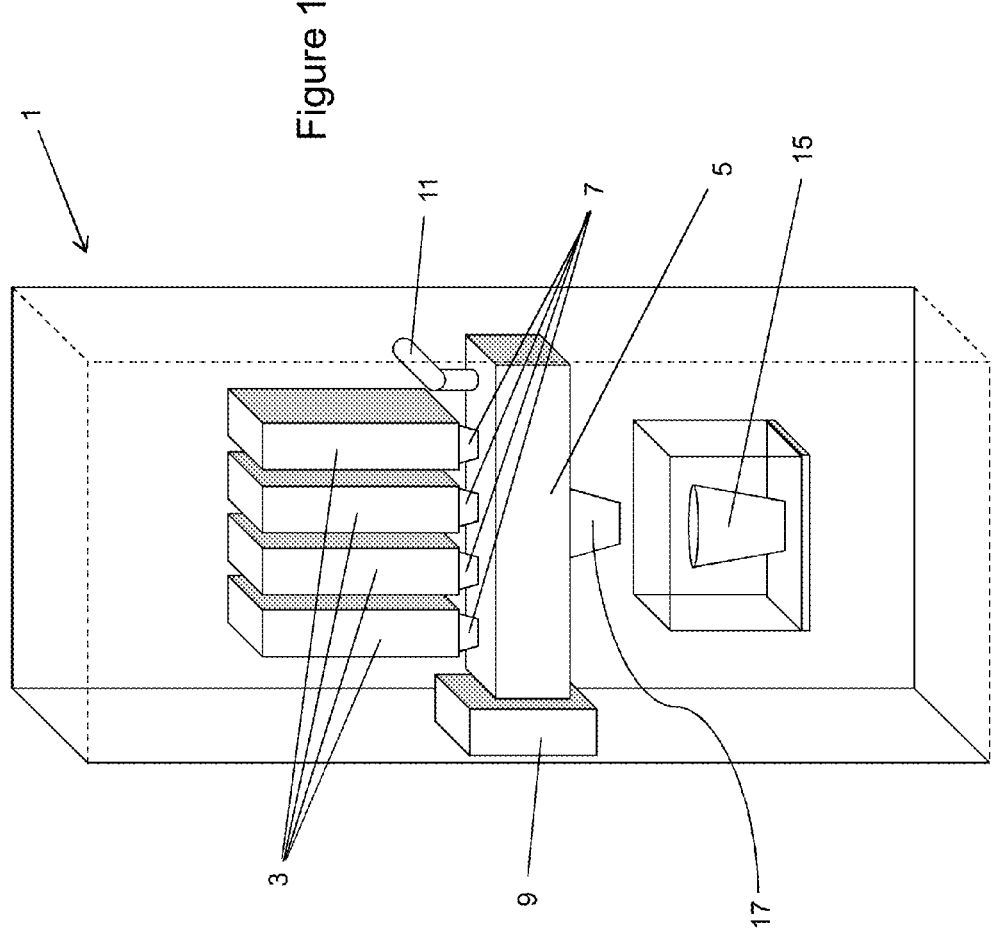

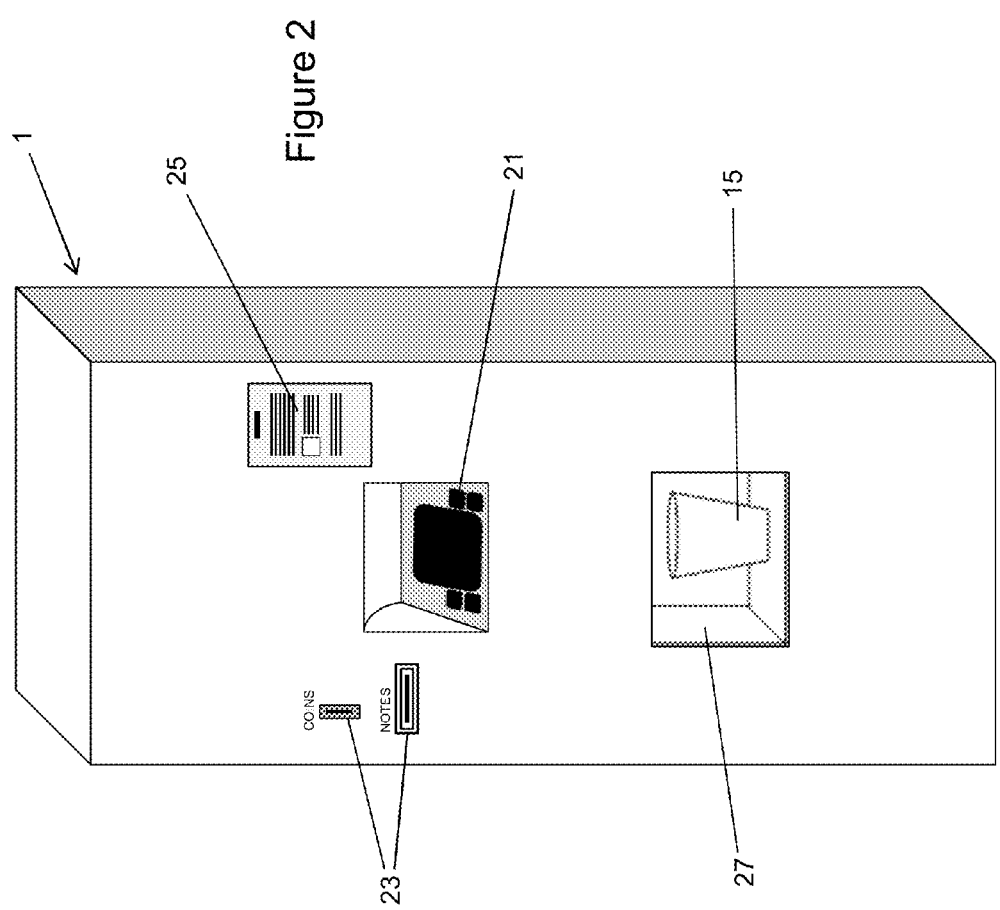

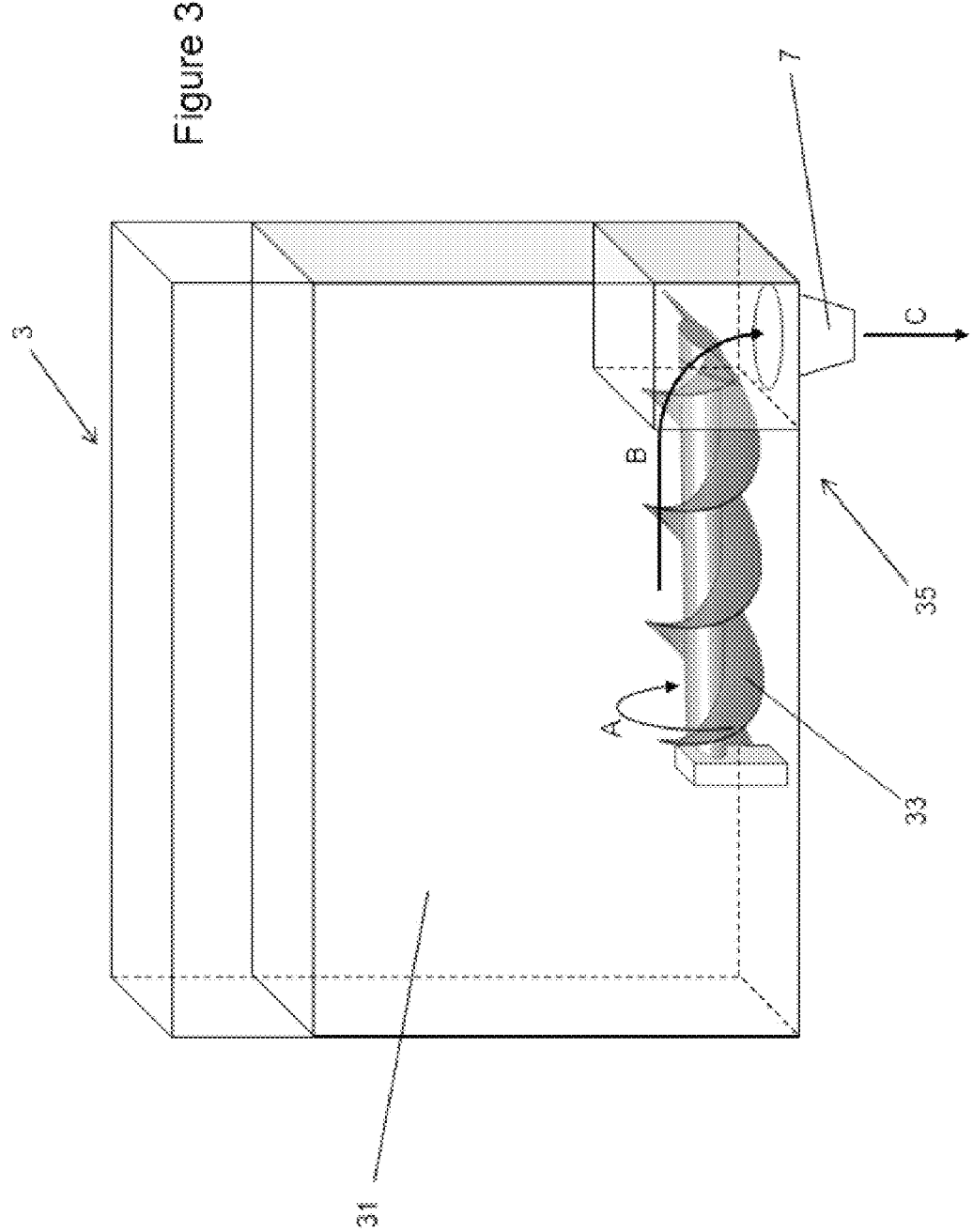

NUTRITIONAL PRODUCT DISPENSER

TECHNICAL FIELD

This invention relates to dispensers for dispensing nutritional products. In particular to dispensers of customised nutritional beverages.

BACKGROUND ART

There are many types of beverage dispenser devices in use. Their ease of use, ability to dispense a variety of beverages from one machine, and low maintenance requirements give them great appeal to anyone wishing to provide a selection of beverages in a self-service environment.

A typical beverage dispenser can be found in US 2008/0206429. This patent application describes a beverage dispenser that mixes one or more additives such as flavourings with a base liquid.

The controller within the dispensing machine receives a selection of desired flavoured beverage from a human operator or user of the dispenser via a user interface.

The dispenser then mixes the drink according to set instructions that are stored in a storage device within the machine. A set of instructions for mixing each drink available to the user are stored within the storage media.

This type of dispenser is only designed to deal with a relatively small selection of drinks, typically with each one being a different flavour for the user to choose from.

US 2007/0073557 A1 discloses a system for making and delivering genetically-based personalised nutrient and supplement mixtures.

This document introduces the idea of dispensing a customised beverage that is prepared based on the genetic profile of the user using genetic analysis and is mainly directed to using liquid ingredients. Tests have shown that 'wet' protein at the concentration required is not stable for use in these types of dispensers and can cause a large amount of bacteria build-up. The use of powdered ingredients is also proposed.

DISCLOSURE OF THE INVENTION

This invention provides an apparatus for dispensing nutritional products comprising:
  a number of storage hoppers for powdered ingredients;
  a controllable outlet in each storage hopper that is operable to release controlled amounts of the powdered ingredients;
  a controllable liquid supply;
  a mixer; and
  a control system including a user interface for capturing data from a user;
wherein
the control system uses the data that the user inputs to determine the quantity of each powdered ingredient and the quantity of liquid to be released to create a nutritional product, and sends signals to the liquid supply and the outlets to release the determined quantity of liquid and each powdered ingredient into the mixer to be mixed before being dispensed into a container.

The mixer can comprise a series of mixers, and can comprise a mixing chamber into which the liquid and powdered ingredients are released for mixing prior to being dispensed.

The controllable outlet can comprise an auger or other controllable valve.

The user interface can be configured to capture physical data from the user.

The user interface can configured to capture body weight and body fat index data.

The control system can be configured to calculate the user's lean body mass from the entered body weight and body fat index.

The control system can also be configured to capture exercise and/or workout type data from the user; and to determine the quantity of each powdered ingredient and quantity of liquid using an algorithm or a look up table.

The nutritional product can be a pre-, post- or mid-workout supplement.

The powdered ingredients can comprise carbohydrates and proteins, and can further comprise flavourings, creatine, L-Glutamine, Antioxidants, Beta-Alanine and/or BCAA.

The carbohydrate ingredients can comprise complex carbohydrate (such as Palatinose), Maltodextrin and/or Dextrose and the protein ingredients can comprise Micellar Casein, Calcium Caseinate and/or Hydrolysed Whey Protein.

According to a more general aspect the invention provides an apparatus for dispensing a nutritional drink comprising:
  one of more storage hoppers for powdered ingredients;
  a controllable outlet connected to each one or more storage hoppers and operable to release controlled amounts of the powdered ingredients to the mixer;
  a hot and cold liquid supply means to supply an amount of cold liquid to the mixer followed by an amount of hot liquid to the mixer after mixing of the powdered ingredients and cold liquid has occurred.

The powdered ingredients may comprise protein and/or carbohydrates.

The number of storage hoppers may range from 1-10, typically from 2-5. An exemplary number is three. Each storage hopper may comprise a single powdered ingredient or more than one individual powdered ingredient. The powdered ingredients may be supplied from a single hopper or supplied from more than one hopper. Each storage hopper may comprise different powdered ingredients or different ratios of the same powdered ingredients.

The control system may determine based upon the data that the user inputs, the ratio and/or amount of the powdered ingredients to be supplied. The control system may determine based upon the data that the user inputs, which hopper or hoppers are used to dispense the powdered ingredients. For example, a larger quantity of ingredients may be dispensed for a heavier person than a light person. Furthermore the ratio of each ingredient, for example the ratio of protein:carbohydrate or the types of protein and/or carbohydrate to be supplied may be determined by data that the use inputs such as body fat index, or pre, post or mid workout.

The liquid may be water.

The cold liquid supply means may be connected to a source of liquid supply such as the water mains or a source of filtered water. Similarly the hot liquid supply system may be connected to a source of hot water. The apparatus may comprise a hot water boiler to supply hot water.

This invention also provides a method of dispensing nutritional products from an apparatus comprising a number of storage hoppers for powdered ingredients; a controllable outlet in each storage hopper; a liquid supply; and a mixer; the method comprising:
  collecting data from the user;
  operating the one or more outlets and the liquid supply to release controlled amounts of powdered ingredients and liquid to the mixer;

mixing the powdered ingredients together with the liquid in the mixer; and dispensing the mixed ingredients;

wherein the method further comprises using the data collected from the user to determine the quantity of each powdered ingredient and quantity of liquid to be released into the mixer to create a nutritional product, and controlling the liquid supply and the outlets to release the determined quantity of liquid and each powdered ingredient into the mixer.

A single outlet may be opened to release powdered ingredients from one hopper into the mixer.

According to an embodiment, the method further comprises the steps of mixing the powdered ingredients with cold liquid in the mixer followed by the supply of hot liquid to the mixer. The hot liquid is typically supplied after all the powder has been dispensed from the one or more hoppers. This has the advantage that any residual powder or residual partially dissolved powder remaining in the mixer or any interconnecting pipes that has not been dissolved by the cold liquid may be removed by the hot liquid. This reduces or removes the tendency for the apparatus to clog with any partially dissolved powder, which may affect functioning of the device and/or cause a potential health hazard due to microbial growth. Furthermore the drink is supplied to the user at an ambient temperature potentially facilitating ease of consumption or speed of absorption into the stomach. Typically the volume of cold liquid added is around 80-90% of the final volume of the drink. It may however range between 60-95%. The temperature of the hot liquid to be added may range from 70-100 degrees C. A typical range is from 85-90 degrees C. The use of a hot and cold liquid supply is particularly advantageous for dispensing a nutritional drink wherein the powdered ingredients comprise protein.

The invention further provides a method of dispensing a nutritional product from an apparatus comprising one or more storage hoppers for powdered ingredients; a controllable outlet in each storage hopper; a controllable hot and cold liquid supply; and a mixer; the method comprising:

supplying controlled amounts of powdered ingredients from the one or more hoppers and a controlled amount of cold liquid to the mixer;

mixing the powdered ingredients together with the cold liquid in the mixer;

supplying a controlled amount of hot liquid into the mixture and further mixing the mixture;

dispensing the resulting nutritional drink to the user.

The dispensing of the hot and cold liquid may be carried out by a liquid control system.

The method can comprise collecting physical data from the user. This can include collecting body weight and body fat index data from the user and further comprise calculating the user's lean body mass from the collected body weight and body fat index data.

The method can also comprise capturing exercise and/or workout type data.

The method can comprise determining the quantity of each powdered ingredient and quantity of liquid using an algorithm or look-up table.

The method can comprise determining the quantity of each powdered ingredient and quantity of liquid to form a pre-, post- or mid-workout supplement.

The step of determining the quantity of powdered ingredients can comprise determining quantities of carbohydrates and proteins and can further comprise determining quantities of flavourings, creatine, L-Glutamine, Antioxidants, Beta-Alanine and/or BCAA.

The step of determining the quantity of carbohydrates can comprise determining the quantity of complex carbohydrate (such as Palatinose), Maltodextrin and/or Dextrose, and the step of determining the quantity of proteins can comprise determining the quantity of Micellar Casein, Calcium Caseinate and/or Hydrolysed Whey Protein.

Other aspects of the invention will be apparent from the following description.

BRIEF DESCRIPTION OF THE DRAWINGS

FIG. 1 shows the inside of the apparatus;
FIG. 2 shows the outside of the apparatus;
FIG. 3 shows the inside of a storage hopper.

MODE(S) FOR CARRYING OUT THE INVENTION

Figure 4A:
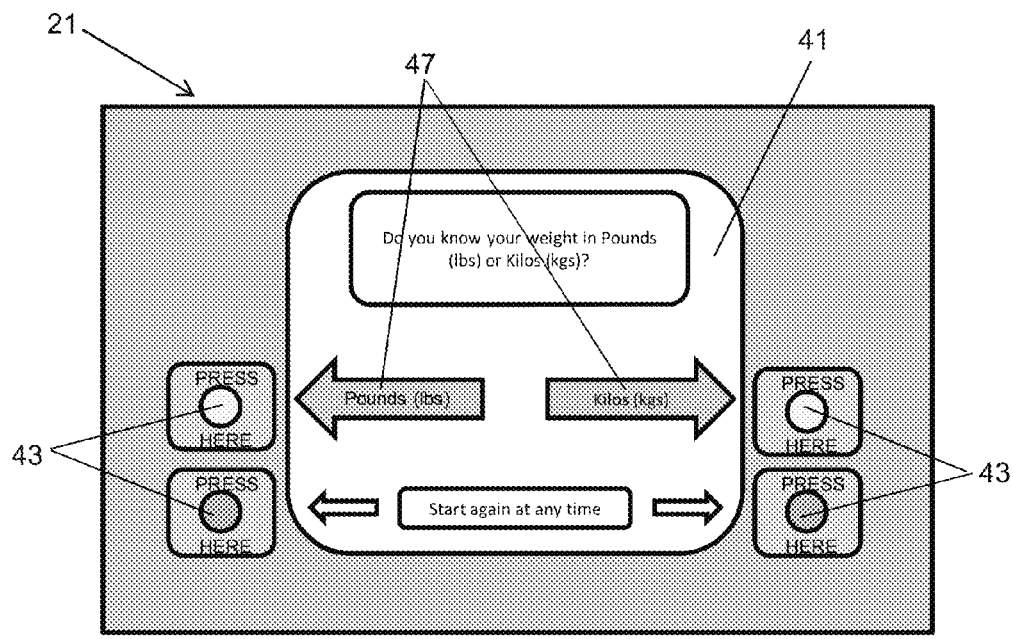
FIGS. 4a and 4b show example screens from the user interface.

FIG. 1 shows the inside of the apparatus 1 which in this figure is shown as a vending machine.

In this embodiment, four storage hoppers 3 are shown, however the number of storage hoppers can be more or less, depending on the number of ingredients that is desired.

The storage hoppers 3 are connected by way of a funnel 5 or other connecting means to a mixer comprising a mixing vessel 5, and a liquid supply 11 such as a water supply is also connected to the mixing vessel.

The liquid supply 11 is controllable such that known quantities of the liquid may be released into the mixing vessel 5.

A control system 9 is connected to each of the storage hoppers 3 and to the liquid supply 11 and can send electronic signals in order to determine how much of each ingredient or how much liquid is released into the mixing vessel.

The control system 9 may also be connected to the mixing vessel 5 in order to send signals telling it when to start and stop mixing the ingredients together and also when to dispense the product.

The mixing vessel 5 is connected to a dispensing nozzle 17 which can dispense the product to a container 15 which may be for example a cup or a bottle.

FIG. 2 show the outside of the apparatus 1 as a user of the machine would see it.

A user interface 21 is provided on the front of the apparatus 1 with which the user can interact. This user interface can comprise but is not limited to one or a combination of the following: a screen or touch screen, hardware buttons, a keyboard, a number pad or voice control system.

An opening 27 in the front of the apparatus 1 allows the user to reach in and take the container 15 into which the product has been dispensed.

There may be further provided a set of instructions 25 for using the apparatus affixed to the front as well as means for accepting payment 23 from the user, for example a coin and/or note acceptor as shown in FIG. 2, but may also be a system for taking card payments or other means of payment.

FIG. 3 shows the inside of one of the storage hoppers 3. Most of the hopper 3 is taken up by storage space for the powdered ingredient 31.

An outlet section 35 is provided within the hopper 3. The outlet section 35 comprises an auger or screw 33, which when turned as shown by arrow A, will force the powdered ingredient towards the opening to the mixing vessel as shown by arrow B and then will drop down the connecting means 7 into the mixing vessel as shown by arrow C.

FIG. 4a shows an example of a screen that the user might be shown when using the user interface 21. The user interface 21 comprises a screen 41 and a number of buttons 43.

As shown in FIG. 4a, the screen can be used to ask questions from the user, who inputs an answer using the buttons 43 as directed by the on-screen options 47 that correspond to each of the hardware buttons 43.

Figure 4B:
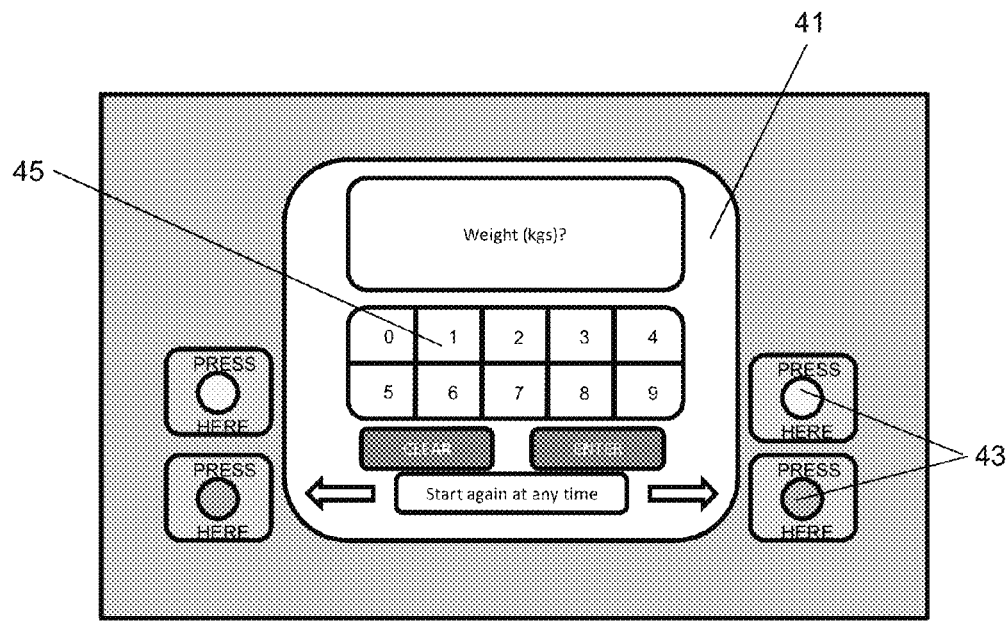

Alternatively the screen 41 may be a touchscreen and may provide the ability for the user to interact with "soft buttons" directly on the screen itself. This can be seen in FIG. 4b, where the user is being asked to enter his/her weight using the on screen buttons 45.

In typical use, a user would first start by proceeding with on-screen instructions. These typically will consist of answering questions to provide the control system with the data it requires.

The data required is physical data about the user and so some of the most likely questions to be asked are the sex of the user, the weight of the user, the body fat index of the user and the type and length of the exercise or workout they have just had, or are about to have.

This data is then fed into the control system which carries out any calculations that are required. For example the lean body mass (LBM) of the user can be calculated from the weight and the body fat index.

Using the user input data as well as the results of any calculations it has performed, the control system can then determine the correct quantities of each of the ingredients in order to create a nutritional product that is completely customised to the user's nutritional requirements. The control system can use an algorithm to determine the ingredient quantities, or alternatively it could use a look-up table, an extract from an example of such a look up table found in Table 1.

This provides the user with a fully customised product that has been individually created according to not only their preferences, as much of the prior art shows, but also according to their nutritional requirements Table 1 shows an exemplary list of the ratio of powdered ingredients that may be dispensed to provide a nutritional drink.

TABLE 1

| ENDURANCE (4C:1P) gms | | | | |
|---|---|---|---|---|
| LBM | Protein | Dex | MaltD | CompC |
| 110 | 13.75 | 13.75 | 13.75 | 27.50 |
| 111 | 13.88 | 13.88 | 13.88 | 27.75 |
| 112 | 14.00 | 14.00 | 14.00 | 28.00 |
| 113 | 14.13 | 14.13 | 14.13 | 28.25 |
| 114 | 14.25 | 14.25 | 14.25 | 28.50 |
| 115 | 14.38 | 14.38 | 14.38 | 28.75 |
| 116 | 14.50 | 14.50 | 14.50 | 29.00 |
| 117 | 14.63 | 14.63 | 14.63 | 29.25 |
| 118 | 14.75 | 14.75 | 14.75 | 29.50 |
| 119 | 14.88 | 14.88 | 14.88 | 29.75 |
| 120 | 15.00 | 15.00 | 15.00 | 30.00 |
| 121 | 15.13 | 15.13 | 15.13 | 30.25 |
| 122 | 15.25 | 15.25 | 15.25 | 30.50 |
| 123 | 15.38 | 15.38 | 15.38 | 30.75 |
| 124 | 15.50 | 15.50 | 15.50 | 31.00 |

The data in table 1 is taken from an example look-up table for users who are undertaking endurance training. The ingredients shown in table 1 are mixed in the ratio 4:1 for carbohydrates compared to protein. Further ingredients such as flavourings and extra boosters such as creatine may also be added, depending on the user's preferences.

TABLE 2

| BULKING (2C:1P) gms | | | |
|---|---|---|---|
| LBM | Protein | Dex | MaltD |
| 110 | 27.50 | 27.50 | 27.50 |
| 111 | 27.75 | 27.75 | 27.75 |
| 112 | 28.00 | 28.00 | 28.00 |
| 113 | 28.25 | 28.25 | 28.25 |
| 114 | 28.50 | 28.50 | 28.50 |
| 115 | 28.75 | 28.75 | 28.75 |
| 116 | 29.00 | 29.00 | 29.00 |
| 117 | 29.25 | 29.25 | 29.25 |
| 118 | 29.50 | 29.50 | 29.50 |
| 119 | 29.75 | 29.75 | 29.75 |
| 120 | 30.00 | 30.00 | 30.00 |
| 121 | 30.25 | 30.25 | 30.25 |
| 122 | 30.50 | 30.50 | 30.50 |
| 123 | 30.75 | 30.75 | 30.75 |
| 124 | 31.00 | 31.00 | 31.00 |

The data in table 2 is taken from an example look-up table for users who are undertaking resistance-bulking training. The ingredients shown in table 2 are mixed in the ratio 2:1 for carbohydrates compared to protein. The complex carbohydrates included in the endurance training mix are not present in the bulking training mix. Again, further ingredients such as flavourings and extra boosters such as creatine may also be added, depending on the user's preferences.

Once the required quantities of all the ingredients is known, the control system sends a signal to each of the outlets within the storage hoppers which releases the set quantity of the powdered ingredient into the mixer.

As the ingredients are released into the mixer water is added and the ingredients and liquid are fully mixed. This makes sure that each product that is dispensed to users is mixed fully.

The prior art method of dispensing the powders and liquid separately into a cup can leave some ingredients as residue in the cup, and therefore not giving the user the correct ratio of ingredients that the individual requires.

When the mixing process has finished, the product can be dispensed to the user through a nozzle and into a container, such as a cup or a bottle.

The apparatus will then go through a self cleaning cycle once the product has been dispensed and taken by the user.

It is understood that other changes can be made whilst staying within the scope of the invention.

The invention claimed is:

1. An apparatus for dispensing nutritional products comprising:
   a number of storage hoppers for powdered ingredients;
   a respective controllable outlet connected to each respective storage hopper and operable to release controlled amounts of one or more powdered ingredients in the respective storage hopper;
   a controllable liquid supply for releasing controlled amounts of a liquid;
   a mixer; and
   a control system including a user interface for capturing data for a user;
   wherein
   the user interface is configured to capture body weight and body fat index data for the user;
   the control system is configured to calculate a lean body mass of the user from the body weight and body fat index data captured by the user interface;
   the control system is configured to use the lean body mass of the user calculated by the control system to determine a respective quantity of one or more powdered ingredients to be released from each respective storage hopper and a quantity of liquid to be released from the controllable liquid to create a nutritional product;

the control system is configured to send a signal to the controllable liquid supply to release the quantity of liquid determined by the control system and to send a signal to each respective controllable outlet to release from the respective storage hopper the respective quantity of the one or more powdered ingredients determined by the control system into the mixer to be mixed before being dispensed into a container.

2. An apparatus as claimed in claim 1, wherein the mixer comprises a series of mixers.

3. An apparatus as claimed in claim 1, wherein the mixer comprises a mixing chamber into which the liquid and powdered ingredients are released for mixing prior to being dispensed.

4. An apparatus as claimed in claim 1, wherein each respective controllable outlet comprises an auger or screw that can be driven to release a desired amount of one or more powdered ingredients from the respective storage hopper.

5. An apparatus as claimed in claim 1, wherein the user interface is configured to capture physical data from the user.

6. An apparatus as claimed in claim 1, wherein the control system is configured to capture exercise and/or workout type data from the user.

7. An apparatus as claimed in claim 1, wherein the control system is configured to determine the quantity of each powdered ingredient and quantity of liquid using an algorithm or a look up table.

8. An apparatus as claimed in claim 1, wherein the nutritional product is a pre-, post- or mid-workout supplement.

9. An apparatus as claimed in claim 1, wherein the powdered ingredients comprise carbohydrate ingredients and protein ingredients.

10. An apparatus as claimed in claim 9, wherein the powdered ingredients further comprise flavourings, creatine, L-Glutamine, antioxidants, Beta-Alanine and/or BCAA.

11. An apparatus as claimed in claim 9, wherein the carbohydrate ingredients comprise complex carbohydrates (such as Palatinose), Maltodextrin and/or Dextrose.

12. An apparatus as claimed in claim 9, wherein the protein ingredients comprise Micellar Casein, Calcium Caseinate and/or Hydrolysed Whey Protein.

13. An apparatus according to claim 1 wherein the controllable liquid supply comprises a cold water supply means and a hot water supply means to supply respectively cold and hot water to the mixer.

* * * * *